United States Patent [19]

Van Scott et al.

[11] 3,904,766
[45] Sept. 9, 1975

[54] TREATMENT OF PSORIASIS

[76] Inventors: Eugene J. Van Scott, 1138 Sewell Ln., Rydal, Pa. 19046; Ruey J. Yu, 4400 Dexter St., Philadelphia, Pa. 19128

[22] Filed: June 19, 1973

[21] Appl. No.: 371,516

[52] U.S. Cl. .................................. 424/325; 424/88
[51] Int. Cl.² .................. A61K 31/13; A61K 39/00
[58] Field of Search .............................. 424/88, 325

[56] References Cited
UNITED STATES PATENTS

| | | | |
|---|---|---|---|
| 3,676,547 | 7/1972 | Galloway et al. | 424/88 |
| 3,678,149 | 7/1972 | Prigal | 424/88 |
| 3,704,282 | 11/1972 | Spector | 424/88 |

OTHER PUBLICATIONS

Taylor et al., Arch Derm, Vol. 106, 9/1972, pp. 362–364.
Merck Index, 8th Edition, 1968, pp. 646–647.
Epstein et al., Arch Derm., 102, 11/1970, pp. 504–506.
Remington's Pharmaceutical Sciences 1965 pp. 527–529.
Handbook of Non–Prescription Drugs, 1973, pp. 163–165.

*Primary Examiner*—Albert T. Meyers
*Assistant Examiner*—Norman A. Drezin
*Attorney, Agent, or Firm*—Le Blanc & Shur

[57] ABSTRACT

A stable composition of mechlorethamine hydrochloride in vehicles composed of white petrolatum and white mineral oil or solid and liquid vegetable oils which will resist degradation at room temperature is presented. The composition is highly antimitotic and effective when applied topically as a treatment for psoriasis. Also disclosed is a method for inducing immunity in patients prior to treatment of psoriasis with the composition of this invention by intraveneous injections of minute quantities of an aqueous solution of mechlorethamine hydrochloride weekly for a period of at least 3 weeks.

3 Claims, No Drawings

TREATMENT OF PSORIASIS

This invention relates to the treatment of psoriasis by topical application of a nitrogen mustard compound stabilized in an oil vehicle, and to a method whereby a specific immunologic tolerance to the compound is induced in patients before topical administration of the composition to prevent delayed hypersensitivity.

Mechlorethamine hydrochloride [$CH_3N(CH_2CH_2Cl)_2 \cdot HCl$] is a highly toxic nitrogen mustard. It is poisonous, a necrotizing irritant, and a vesicant. This compound, which will be hereinafter referred to as HN2.HCl, has been known for many years as a potentially effective agent against the various skin disorders mycosis fungoides, and psoriasis. See Epstein et al. "Effects of Topical Mechlorethamine on Skin Lesions of Psoriasis" 102, Arch Derm, 504 (Nov. 1970).

However, as noted by Taylor et al in "Topical Use of Mechlorethamine in the Treatment of Psoriasis," 106 Arch Derm 326 (Sept. 1972), therapeutic use of HN2.HCl has not been recommended because of the high incidence of allergic contact dermatitis observed in tests. Accordingly, although the compound is potentially effective to repress symptoms of certain diseases, prolonged usage produced a delayed hypersensitive reaction which aggravated the pre-existing disorder, thereby proving more undesirable than the particular disease being treated.

In addition, use of the compound on an out-patient basis is complicated by the fact that HN2.HCl readily degrades in aqueous solution. Therefore the solution must be prepared fresh for each application and immediately used by the patient. This procedure is time consuming and requires repeated handling of the highly poisonous HN2.HCl powder by generally untrained personnel. Use of HN2.HCl then to treat skin disorders such as psoriasis was not thought to be feasible prior to this invention.

Psoriasis is a chronic skin disease, and remains a disfiguring and disabling cutaneous impairment to millions of persons. Its etiology is completely unknown, and therefore, prevention remains inconceivable. Therapy has necessarily been empiric, and has included the systemic use of antimitotic drugs such as methotrexate to induce remissions of the lesions. However, acute and chronic toxicity on tissues other than skin discredited use of methotrexate. Therefore, it became imperative that other means of therapy be found either by external delivery of drugs so that toxicity is confined chiefly to the skin, or by the discovery of new drugs having non-toxic attributes.

It has now been discovered, however, that HN2.HCl may be effectively utilized in the treatment of psoriasis by topical application without the aforementioned disadvantages. HN2.HCl has been found to be stable in an ointment, which contains no water, for adequately long periods of time. In addition, if treatment is preceded by inducing an immunologic tolerance the patient will not be susceptible to a delayed hypersensitive reaction. The procedure for inducing immune tolerance as will be subsequently explained, includes weekly intravenous injections of minute quantities of HN2.HCl in an aqueous solution over at least a three week period to initiation of therapy with the ointment of this invention.

Accordingly, it is an object of this invention to provide a new treatment for psoriasis.

It is another object to provide a stable HN2.HCl containing ointment composition which may be stored at room temperature indefinitely without degradation.

It is another object to provide an ointment composition for topical application to the human body in treatment of psoriasis lesions including a solution of a nitrogen mustard in an anhydrous alcohol which is mixed with a white petrolatum and white mineral oil or liquid and solid vegetable oil base.

It is another object to provide an ointment composition for topical application to the human body in treatment of psoriasis lesions including a nitrogen mustard powder dispersed in a white petrolatum and white mineral oil base or a liquid and solid vegetable oil base.

It is still another object of this invention to provide an ointment composition containing a nitrogen mustard, HN2.HCl, stabilized in an ointment base whereby from 0.01 to 0.05% HN2.HCl is present therein.

It is yet another object to provide a method for treatment of psoriasis whereby minute quantities of about 200 micrograms of HN2.HCl in aqueous solution are injected intravenously once weekly for at least three weeks prior to initiation of topical application of an ointment to the lesions comprising from 0.01 to 0.05%, by weight HN2.HCl in an ointment vehicle including white mineral oil and petrolatum or liquid and solid vegetable oils.

These and other objects will become readily apparent with reference to the following description:

The nitrogen mustard HN2.HCl is a well known compound available commercially under the trade name of Mustargen. The compound, however, is highly unstable in aqueous solution and therefore is marketed as a white, crystalline, hygroscopic powder.

As detected by thin-layer chromatography HN2.HCl in aqueous solution degrades rapidly to form three products:

Methyl-$\beta$-chloroethyl-$\beta$-hydroxyethylamine

N,N'-Dimethyl-N,N'bis ($\beta$-chloroethyl)piperazinium chloride

Methyl-bis-($\beta$-hydroxyethyl)amine

The mobilities, Rf values, of HN2.HCl itself and the above three degradation products are 0.80, 0.67, 0.49, and 0.29, respectively, in a solvent system of methanol:benzene (1:1).

As examples of the rapid degradation of HN2.HCl, after a 1% aqueous solution was stored at room temperature for no more than twenty hours half of the starting amount of HN2.HCl was degraded. After fifteen days of aging an aqueous solution of HN2.HCl was found to have lost 90% of its potency as an antimitotic agent when tested on mouse vaginal epithelium. At higher temperatures the rate of degradation accelerated considerably. For example, when a freshly prepared 1% aqueous solution of HN2.HCl was heated at 100°C. for 3 hours all of the HN2.HCl was degraded to the aforementioned three degradation products.

None of the degradation products have been found to be active against psoriasis when applied topically. Because only HN2.HCl itself is active therapeutically, it therefore is essential to minimize degradation. Accordingly, aqueous solutions of HN2.HCl or water containing vehicles therefor are undesirable in formulating a therapeutic composition for treating psoriasis.

It has been discovered, however, that HN2.HCl is soluble in isopropyl alcohol and in anhydrous ethanol, and is also stable in solution with these vehicles. For example, after six months of aging an ethanolic solution of HN2.HCl only a trace amount (<1%) of a degradation product was observed.

Accordingly one method of forming the composition of this invention includes the steps of first dissolving HN2.HCl powder in anhydrous ethanol, and then mixing the solution with an oil base to form an ointment. Alternatively, it has been discovered that HN2.HCl powder may be dispersed directly in the oil base ointment without first dissolving in anhydrous ethanol.

Generally, the concentration of HN2.HCl in the composition of this invention ranges from 0.01 to 0.05% by weight. However, the preferred concentration is 0.018%. The volume of anhydrous ethanol, if used, may range up to 10% by weight of the total composition, but the preferred concentration is usually less than 1%.

The ointment base may be a mixture of white mineral oil and white petrolatum. The oil may be present in the mixture in a range from 20 to 100% by weight. However, the preferred concentration is 40%, with the remaining 60% being white petrolatum. HN2.HCl ointments prepared according to this invention have been found to be stable at room temperature. For example, a methanol extract of a 6-month old HN2.HCl ointment of this invention prepared with anhydrous ethanol as described above showed the presence of HN2.HCl, and the absence of any detectable degradation products. The ointment also retained its full antimitotic effectiveness when tested on mouse vaginal epithelium. In addition, ointments aged up to 6 months and applied, according to the method of this invention, to lesions of psoriasis were also found to remain effective in causing remissions of those lesions.

The composition of this invention may alternatively be formulated in an ointment base of solid and liquid vegetable oils as follows: HN2.HCl is first dissolved in anhydrous ethanol, and then admixed with solid and liquid vegetable oils by mechanical mixing. The concentration of HN2.HCl may range from 0.01 to 0.05% by weight, with the preferred concentration of HN2.HCl being 0.018%. The volume of anhydrous ethanol may range from 1 to 10%, with the preferred concentration being 1% of the total ointment. The concentration of solid and liquid vegetable oils in the ointment base may each range from 0 to 100%. However, the preferred concentrations are 70% and 30%, by weight, respectively.

Treatment of psoriasis according to this invention begins with the development of an immunological tolerance to HN2.HCl so that the patient will avoid a delayed hyper sensitivity by the following procedure.

Two hundred micrograms of HN2.HCl in a sterile aqueous solution having a volume of about 0.4 ml were injected intraveneously once weekly from a 1 ml syringe with a 25 gauge needle. Care was taken to assure that the needle was within the lumen of the vein before the drug was ejected; after ejection, the patient's arm was extended overhead in an upright position before the needle was withdrawn to minimize any extravascular leaking of the drug. Injections were made on days 0, 7, 14, 21 and 28 with topical application of the composition of this invention beginning not before the 21st day.

The aforementioned procedure for inducing immunity was administered to a group of 12 patients which had not been previously exposed to HN2.HCl or other alkylating agents by any route, and no special precautions were taken against possible adverse allergic reactions. Subsequent application of HN2.HCl topically resulted in no allergic reaction or delayed hypersensitivity in any of the 12 patients. No patient in this group has become sensitized during therapy ranging from periods of 3 months to over 2 years.

The following are examples of preparations of the HN2.HCl ointment composition of this invention:

EXAMPLE 1

HN2.HCl (400 mg) was dissolved in anhydrous ethanol (20 ml) and the solution added to white solid petrolatum (1,350 g) and liquid petrolatum (mineral oil) (900 g) in a mixing bowl. Mechanical mixing was started and continued for 2 hours until an ointment of uniform consistency was formed.

After 6 months of aging a sample of the ointment was extracted with methanol and the extract examined by thin layer chromatography. The methanol extract showed the presence of HN2.HCl and no trace of any degradation products. After 6 months of aging a sample of the ointment was directly instilled into vaginas of 10 female mice. Histological examination of the treated vaginal epithelium showed that the HN2.HCl ointment after 6 months of aging still retained a full strength of antimitotic effectiveness. Daily topical applications of the ointment to skin lesions of psoriasis caused clinical remissions of the lesions.

EXAMPLE 2

White petrolatum (1,350 g) and white mineral oil (900 g) were placed in a 5 lb. mixing bowl. Mechanical mixing was started and HN2.HCl powder (400 mg) was added slowly into the mixture. The mixing was continued for 3 hours until an ointment of uniform consistency was formed. Examination of the ointment under a microscope indicated that fine crystals of HN2.HCl were evenly dispersed in the ointment. The HN2.HCl ointment thus prepared was found to be chemically stable at room temperature.

EXAMPLE 3

HN2.HCl (200 mg) was dissolved in anhydrous ethanol (10 ml) and the solution added to solid vegetable oil (700 g) and liquid vegetable oil (300 g) in a mixing bowl. Mechanical mixing was started and continued for 2 hours until a white ointment of uniform consistency was formed. The HN2.HCl ointment thus prepared was found to be chemically stable at room temperature, highly active as an antimitotic agent when tested in the mouse vagina, and clinically effective in causing remission of psoriasis when applied topically to lesions.

Patients with psoriasis were instructed to apply, with their fingers, twice daily, the HN2.HCl ointment of this invention to areas of the skin involved with lesions of psoriasis. Improvement of lesions, usually evident within four weeks, has occurred in over forty of 50 patients treated to date. In approximately half of improved cases, improvement has been substantial, e.g. degrees of improvement estimated at 75% or more. Improvement has been maintained with continued application of ointments, which have been applied daily for periods of 6 weeks to several months.

In conclusion, it has been discovered that HN2.HCl may be formulated in a stable vehicle for use in the treatment of psoriasis if the vehicle contains no water.

The HN2.HCl powder may be initially dissolved in anhydrous alcohol and admixed with an oil base. In the alternative the HN2.HCl powder may be added directly to an oil base. The base may be a mixture of petrolatum and mineral oil, or a mixture of solid and liquid vegetable oils.

The ointment of this invention has been found to be stable if stored at room temperature and highly effective in treating the lesions of psoriasis. Treatment, however, should be preceded by desensitization.

An immune tolerance to delayed hypersensitivity to the ointment of this invention is induced with at least four intraveneous injections of minute quantities of an aqueous solution of HN2.HCl. The injections are given on day 0, 7, 14, 21 and 28 if necessary, but treatment with the ointment of this invention may begin on day 21.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A method for alleviating the symptoms of psoriasis in humans suffering therefrom comprising the steps of:
   inducing an immunological tolerance to mechlorethamine hydrochloride by successively injecting, intraveneously, about 200 micrograms thereof in an aqueous solution once weekly for at least three weeks; and
   subsequently applying, topically, to involved areas of the human body an effective amount of a composition containing mechlorethamine hydrochloride in a concentration of from 0.01 to 0.05 percent, by weight, of the total composition, in an anhydrous pharmaceutically acceptable carrier.

2. The method of claim 1 wherein the topical application of said composition begins after the fourth injection of said solution.

3. The method of claim 1 wherein the carrier comprises at least one member selected from the group consisting of petrolatum and mineral oil.

* * * * *